(12) United States Patent
Malik (10) Patent No.: US 6,782,081 B2
(45) Date of Patent: Aug. 24, 2004

(54) AUTOMATED DELIVERY OF INSTANT MESSAGE TO A TELEPHONE LINE DEVICE

(75) Inventor: Dale W. Malik, Dunwoody, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 64 days.

(21) Appl. No.: 10/223,834

(22) Filed: Aug. 19, 2002

(65) Prior Publication Data

US 2003/0219109 A1 Nov. 27, 2003

Related U.S. Application Data

(60) Provisional application No. 60/382,106, filed on May 21, 2002.

(51) Int. Cl.[7] .............................................. H04M 11/00
(52) U.S. Cl. ................................ 379/93.24; 379/93.17; 379/90.01
(58) Field of Search ........................... 379/93.24, 93.23, 379/93.17, 90.01, 142.01; 370/352

(56) References Cited

U.S. PATENT DOCUMENTS

| 6,192,116 | B1 | * | 2/2001 | Mayak | .................... | 379/93.23 |
| 6,304,642 | B1 | | 10/2001 | Beamish et al. | ........ | 379/142.01 |
| 6,310,944 | B1 | * | 10/2001 | Brisebois et al. | ......... | 379/93.23 |
| 6,542,586 | B1 | * | 4/2003 | Helstab | .................... | 379/93.23 |
| 2003/0021290 | A1 | * | 1/2003 | Jones | ......................... | 370/352 |
| 2003/0035528 | A1 | * | 2/2003 | Baker | .................... | 379/207.04 |
| 2003/0061290 | A1 | * | 3/2003 | Koch et al. | .............. | 379/93.24 |
| 2003/0112952 | A1 | * | 6/2003 | Brown et al. | .......... | 379/211.01 |

OTHER PUBLICATIONS

Pub. No.: U.S. 2001/0002209 A1; Han; Pub. Date: May 31, 2001; pp. 1–6, plus Fig. pp. 1–2.

* cited by examiner

Primary Examiner—Stella Woo
(74) Attorney, Agent, or Firm—Thomas, Kayden, Horstemeyer & Risley LLP (57) ABSTRACT

One preferred embodiment of the present invention provides a system and methods for relaying a message over a telephone line to a first user. Briefly described, in architecture, one embodiment of the system, among others includes, can be implemented as follows. A communication server forwards a message to a communication gateway. The communication gateway directs the message to caller-ID display via the telephone line. Methods and other systems are also provided.

31 Claims, 5 Drawing Sheets

AUTOMATED DELIVERY OF INSTANT MESSAGE TO A TELEPHONE LINE DEVICE

CROSS-REFERENCE TO RELATED APPLICATION

This application claims priority to copending U.S. provisional application entitled, "Integration of instant Messaging and Computer Operating Systems," having ser. No. 60/382,106, filed May, 21, 2002, which is entirely incorporated herein by reference.

TECHNICAL FIELD

The present invention is generally related to communication and, more particularly, is related to a system and method for relaying messages over a telephone line.

BACKGROUND OF THE INVENTION

A wide variety of communication services are available to a user of a modern public switched telephone network (PSTN). These services include voice mail, conference calling, call forwarding, and calling name delivery (CNAM). CNAM is considered a valuable service by many users because it allows a called party to view information about a calling party on a display unit. Specifically, when the called party receives a call, information including the calling party's name and directory number, as well as the date and time of the call may be transmitted to the display unit. Unfortunately, this identification information associated with a telephone call is generally the only information that can be transmitted to the display unit.

Figure 1:
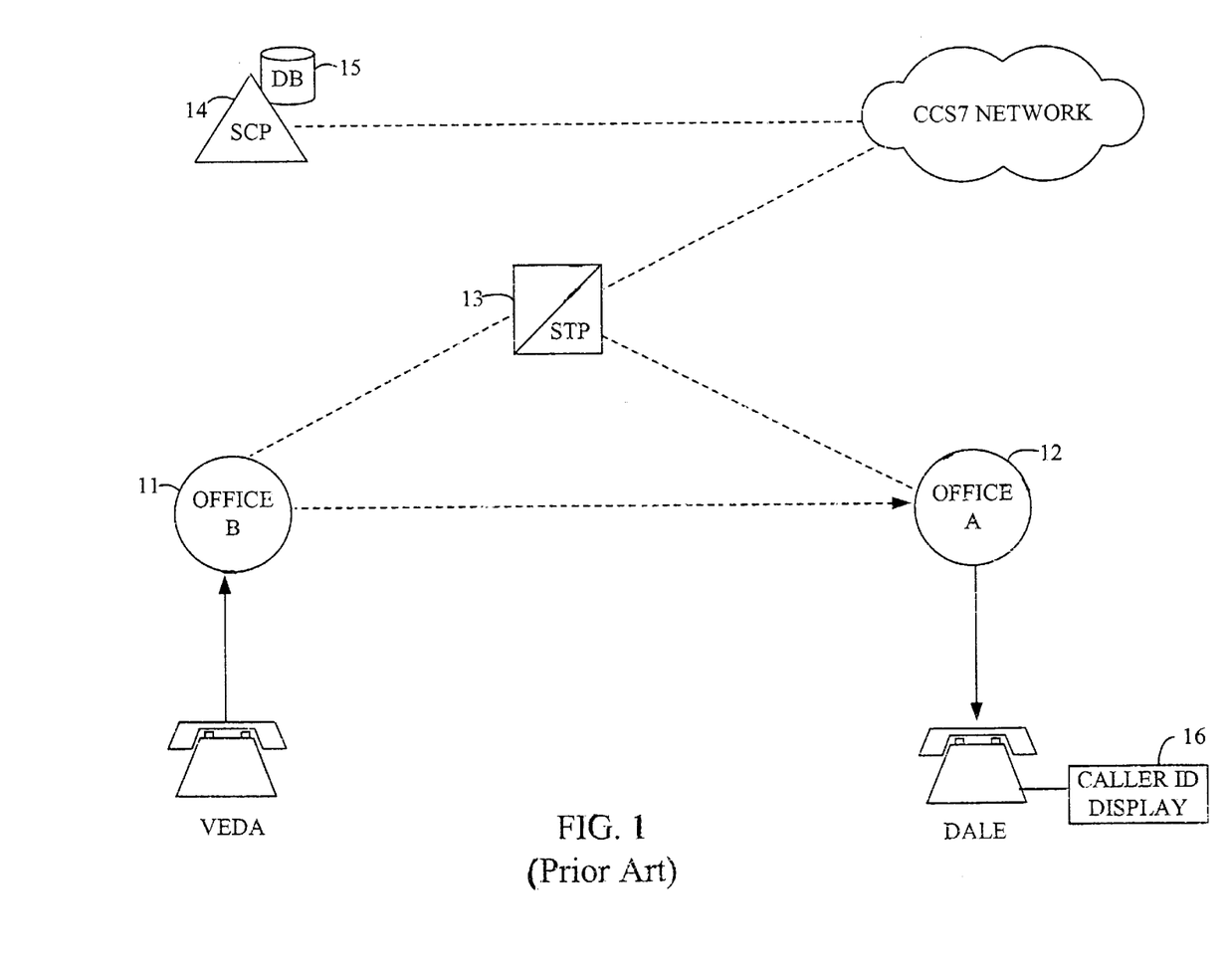
FIG. 1 is a block diagram of a CNAM operating environment of the prior art.

Today, the delivery of calling name information is typically implemented in accordance with the model illustrated in FIG. 1, which is a prior art diagram of the CNAM operating environment. Referring to FIG. 1, a calling party, Veda, picks up the telephone and dials the directory number of a called party, who is a CNAM subscriber, Dale. In this example, Veda dials 770-555-6789. Next, a switch 11 (Office B) serving Veda obtains routing information and populates an initial address message (IAM) with certain information. The IAM is a parameter that exists within an integrated services digital network user part (ISUP) signaling message. An ISUP signaling message employs a Common Circuit Signaling System 7 (CCS7) call setup protocol. In particular, the IAM is populated with Veda's directory number (770-555-1234), Dale's directory number (770-555-6789), and a presentation parameter. The presentation parameter prompts calling party information to be shown on a CNAM display.

Office B then sends this information in the signaling message to an end office 12 (Office A) serving Dale. Office A recognizes that the call is for a CNAM subscriber, so Office A halts the calling process to launch a calling name query on the CCS7 network. As a part of the query launch, Office A populates a calling party address parameter in the query with Veda's directory number, 770-555-1234. The calling party address parameter is a routing parameter within an Advanced Intelligence Network (AIN) query package.

After Office A has populated the calling party address parameter, the calling name query is sent to a signaling transfer point (STP) 13. The STP 13 performs a global title translation (GTT) on the calling party address parameter to determine to which serviced control point (SCP) the calling name query should be routed. This determination is made based on the first three digits in Veda's directory number, in this case, 770. The STP 13 then forwards the calling name query to the appropriate SCP 14. The SCP 14 searches a CNAM database 15 for Veda's record from which the SCP 14 retrieves the associated name. The CNAM database 15 is located preferably as a part of the SCP 14, as shown in FIG. 1, but may be separate from the SCP 14, or incorporated as part of another network element such as a service node or even a switch.

The SCP 14 returns the name associated with Veda's directory number in a transaction capability application part (TCAP) response to Office A. The TCAP response is the final message containing instructions on how to handle the call. The TCAP response message ends the SSP/SCP transaction that began with the calling name query. In this example, "Veda Christmas" (full name) is returned in the TCAP response to Office A.

When Office A completes the call to Dale, Office A sends the calling party's name, Veda Christmas, and Veda's directory number, 770-555-1234, as well as the date and time of the call over Dale's line to Dale's display unit 16. This information is then displayed on Dale's display unit 16, which can be integrated into a telephone or separate therefrom.

In sum, CNAM, is designed to send identification information, such as a calling party's name and directory number, to a called party. As useful as the CNAM service is in providing calling party information, one principle disadvantage of the present CNAM service is that only limited information is transmitted to the display the called party. Thus, a heretofore unaddressed need exists in the industry to address the aforementioned deficiencies and inadequacies.

SUMMARY OF THE INVENTION

Preferred embodiments of the present invention provide systems and methods for relaying a communication message over a telephone line to a user. Briefly described, in architecture, one embodiment of the system, among others, can be implemented as follows. A communication server forwards a message to a communication gateway. The communication gateway directs the message to a caller-ID display via a telephone line.

The present invention can also be viewed as providing methods for relaying a message over a telephone line to a first user. In this regard, one embodiment of such a method, among others, can be broadly summarized by the following steps: receiving a communication message from a communication network; and directing the communication message to the caller-ID display of a user.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Figure 2:
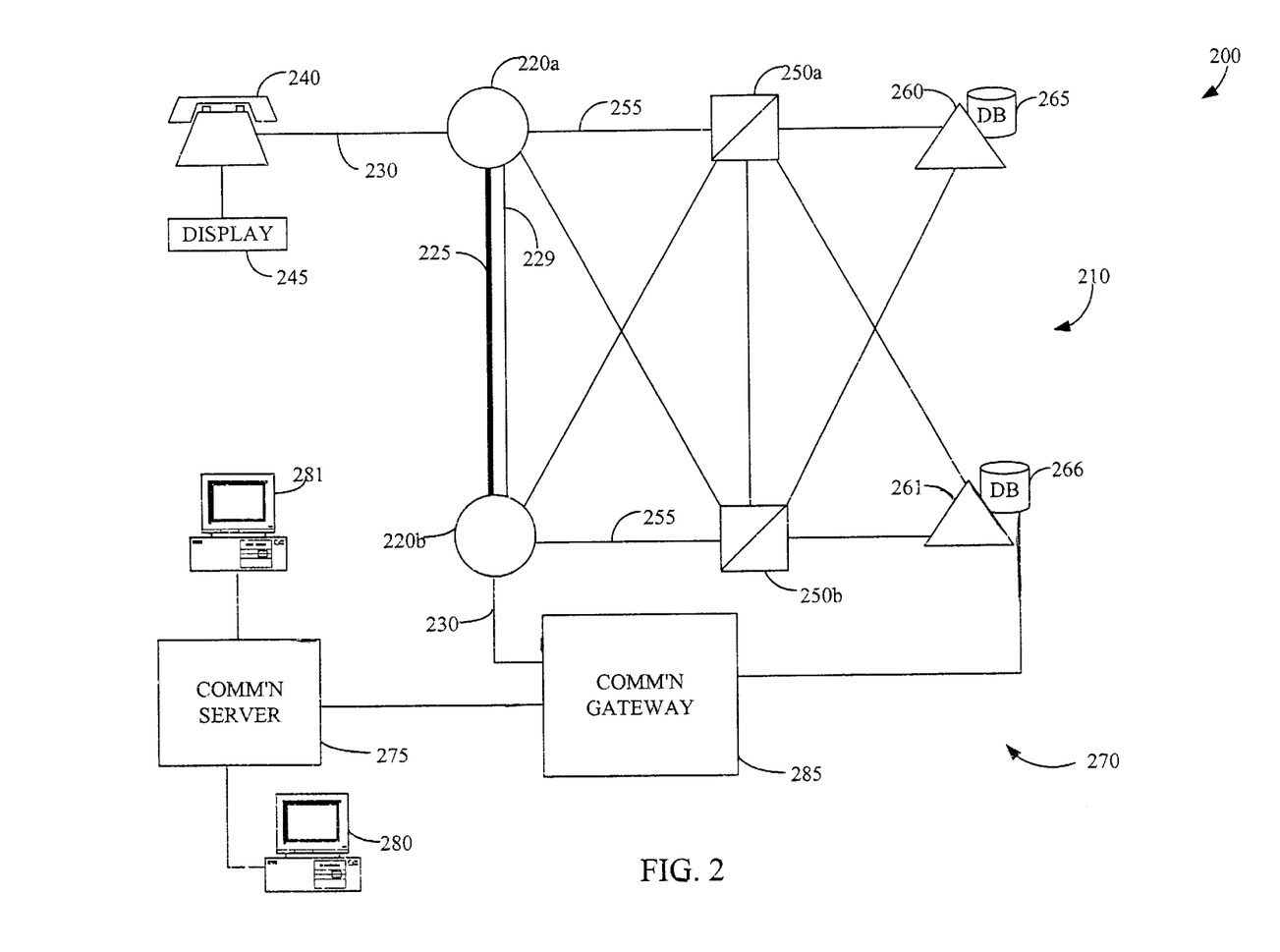
FIG. 2 is a block diagram of an automated telephone messaging system of one preferred embodiment of the present invention.

Depicted in FIG. 2 is one preferred embodiment of an automated telephone messaging system 200 of the present invention. As illustrated, the automated telephone messaging system 200 includes an Advanced Intelligent Network (AIN) 210 of a typical local exchange carrier. The Advanced Intelligent Network 210 includes a plurality of end or central offices, which are indicated as central offices 220a and 220b in FIG. 2. Preferably, each central office includes an "SSP", which is an acronym for service switching point. A service switching point is a switch, and the terms "end office", "switch", "central office", "service switching point" and "SSP" are used interchangeably herein unless a distinction is noted. The number of central offices is arbitrary. The Advanced Intelligent Network 210 also comprises non-SSP central office switches, but such non-SSP switches are not shown in FIG. 2. The difference between an SSP and a non-SSP switch is that an SSP includes intelligent network functionality including appropriate hardware and software so that, when a set of predetermined conditions are detected, the SSP initiates a trigger for a predetermined state of a call on a subscriber's directory number, generates the trigger as an appropriate message in the form of a data query to be sent out over the network, and suspends handling of the call until the SSP receives a response from the network instructing the SSP to take certain action. If the SSP receives no instructions within a certain amount of time, the SSP has a default task to execute with respect to the predetermined condition. A non-SSP switch is an electronic switch that can generate certain rudimentary signaling over the network, but the non-SSP switch must rely on other equipment to provide subscriber lines connected to such a non-SSP switch with more complex features and services available in the Advanced Intelligent Network.

As further illustrated in FIG. 2, central offices 220a–220b have a plurality of subscriber lines designated as 230 connected thereto. Each subscriber line 230 is connected to a piece of terminating equipment including a telephone designated as 240. Although a telephone is illustrated as one of the pieces of terminating equipment in FIG. 2, those skilled in the art will understand that such pieces include other telecommunication units or devices such as facsimile machines, computers, modems, etc.

Throughout this specification, the terms "subscriber," "calling party," "caller," or "called party" may be used. It should be understood that these terms need not refer to human operators of telecommunication devices or equipment, but may refer to devices that are connected to or communicate with the telecommunication network 210 such as computers, facsimile machines, modems, etc. A "call" or "communication" as described herein should be understood to refer to an attempt to establish a communication link between two elements such as a calling party and a called party, or network elements such as between a service node and a central office, as described below.

Pursuant to the preferred environment, each piece of terminating equipment in an Advanced Intelligent Network 210 is assigned a directory number. In the description of the preferred embodiments of the present invention, the term "directory number" is used in its generally understood meaning to be the number which may be dialed or input by a caller or source and used by the network to route the communication so as to reach a piece of terminating equipment associated with the dialed directory number. A directory number is commonly referred to as a telephone number. In the present application, the term "terminates" is used with the terms "call" or "communication" pursuant to their meaning in the field of telephony to mean an ultimate connection of a call or connection to equipment associated with the called party.

Referring again to FIG. 2, central offices 220a, 200b are illustrated as interconnected by a trunk circuit 225. This is the voice path trunk that interconnects the central office switches to connect communication. Each of the central offices in the network 210 is typically connected to a local signal transfer point (STP) 250a, 250b via respective data links designated 255. These data links 255 employ a signaling protocol referred to as Common Circuit Signaling System 7 (CCS7), which is well known to those skilled in the art. Also, central offices 220a, 220b are illustrated as connected by data link 229.

Much of the intelligence of the Advanced Intelligent Network 210 resides in local service control points (SCP) 260, 261. Typically, a SCP 260, 261 is connected to one or more SSPs 220a, 220b through a respective one or more STPs 250a, 250b over CCS7 data links. Among the functions performed by SCPs 260, 261 is the maintenance of network databases 265, 266 which are used in providing telecommunication services. In addition, SCPs 260, 261 include databases such as a subscriber information database that identify particular service subscribers and the services to be accorded to these subscribers. As is well known to those skilled in the art, the Advanced Intelligent Network 210 may also include other elements and connections that have not been described herein, but would be understood by someone in the art.

As also illustrated in FIG. 2, the automated telephone messaging system 200 also includes a communication network 270. The communication network 270 contains communication server(s) 275 and client(s) 280, 281 that receive and send messages to other communication clients connected to any communication server on the Internet. Each communication client 280, 281 is attached to a communication server 275.

Each communication server 275 receives information from a communication client 280 and transfers the information to another communication client 281 or to another communication server. Each communication server 275 functions independently from one another, and can communicate with any other communication server 275 that is connected to the Internet as long as it has been identified, and predisposed to do so ahead of time. Each local communication server 275 performs two primary functions: communicating directly with a communication client 280, 281, and communicating with other communication servers. Each communication server 275 consists of multiple components that separately handle individual functions with the communication system 270. An additional function of the communication server is to communicate with a communication gateway 285. The communication gateway 285 accesses a subscriber information database 265, 266 of a SCP in the Advance Intelligent Network 210. Further, the communication gateway 285 is connected to a subscriber line 230.

It will be appreciated by those skilled in the art that the communication network 270 may employ a variety of messaging technologies, such as electronic mail (email), for example, that utilize a client-server communication environment. In particular, one preferred embodiment of the invention utilizes instant messaging, as one example.

With continuing reference to FIG. 2, an overview of one preferred embodiment for delivering an instant message in a CNAM environment is described. Assume a telecommunication service provider provides service to at least a called party. Service is provided to the called party from an SSP 220a. Also, the communication gateway 285 is provided service from the same or a different SSP 220b. The called party is typically a CNAM subscriber having a display unit 245 connected to the line serving the called party. It will be appreciated by one skilled in the art that a display unit 245 can be any type display device suitable for the CNAM environment, such as a CNAM display unit, a computer display screen, an ADSI compatible telephone, an ADSI telephone, a display unit capable of adapting a non-ADSI telephone for use with CNAM on a call waiting service, and so forth.

In accordance with preferred embodiments of the invention, the called party prompts or requests for communication messages to be forwarded to the display unit 245 from the communication network 270. In this embodiment, the messaging delivery service is an instant messaging service, and the communication network is an instant messaging network. In other alternative embodiments, the called party or the messaging party may subscribe to a message delivery service in order to send communication messages to a display unit 245 and/or to receive communication messages on a display unit 245. Preferably, a fee would be paid for such a service, however, in lieu of paying a fee for this service, a party may consent to receiving announcements or advertisements from third parties. Further, in some embodiments, the called party may not have to prompt or request for communication messages to be forwarded to the display unit 245.

Since instant messaging (IM) is a communication medium that employs presence and availability technology, an instant messaging network recognizes when a user is present and/or available on the network. Accordingly, in one preferred embodiment of the invention, a user, such as the called party, specifies that he or she desires for instant messages to be delivered to the party's caller-ID display unit 245 when the party is net present to receive messages, instead of the messages being stored in a queue, for example. Other embodiments involve instant messages being targeted and directly sent to the display unit 245, or for carbon copies of instant messages to be sent to the display unit 245.

Referring to FIG. 2, a messaging party sends an instant message from an instant messaging client 280, wherein the instant message is addressed to the instant messaging client 281 of the called party, which could be, though not necessarily, co-located with the called party telephone 240. The instant message is sent from the instant messaging client 280 of the messaging party to the communication server 275. The communication server 275 follows routing instructions specified by the called party to direct the instant message to the communication gateway 285. For example, the routing instructions may specify that instant messages to the called party should be directed to the display unit 245 of the caller party whenever the called party is not present and/or available at the instant messaging client 281.

The communication gateway 285 steers the instant message from the communication network 270 to the AIN network 210. Particularly, the communication gateway 285 communicates with a subscriber information database 266 in the AIN network 210. In this particular embodiment, the subscriber information database 266 is a CNAM caller-ID database, wherein telephone numbers are stored with data fields containing caller-ID identification, such as the name and address of the holder of the telephone number. The subscriber information location database is located preferably as a part of the SCP 261, as shown in FIG. 2, but may be separate from the SCP 261, or incorporated as part of another network element such as a service node or even a switch.

The communication gateway 285 also is connected to the telephone network 210 via one or more standard telephone subscriber line 230. The communication gateway 285 generates telephone calls to terminating devices via the telephone network 210. Accordingly, the communication gateway 285 has been assigned a directory number, and the directory number is listed in the subscriber information database 266. Each directory number recorded in the subscriber information database has an associated data field that contains identification information of the entity holding the directory number.

The communication gateway 285 accesses the subscriber information database 266 to dynamically change the data field associated with its directory number. By dynamically updating the data field of a directory number held by the communication gateway, a "dynamic" data field is formed that can hold a brief amount of text from an instant message, e.g. "Meet me at 8, Veda". Therefore, when the communication gateway 285 receives an instant message, the communication gateway 285 accesses the subscriber information database 266 and populates the dynamic data field for the communication gateway's directory number with instant messaging text. The communication gateway then makes a telephone call to the called party, who is a CNAM subscriber. Other embodiments include an expanded data field that holds an increased amount of text and a display unit that is capable of displaying the contents of the data field. Also, in some embodiments, a messaging party may be notified of the limited amount of text that can be displayed in the display unit before the message is sent, so that the messaging party can edit his or her message accordingly.

Referring to FIG. 2, when the communication gateway 285 dials the directory phone number of the called party, central office 220b serving the communication gateway 285 obtains routing information and populates an initial address message (IAM) with the communication gateway directory number, the called party's directory number, and a presentation parameter. The presentation parameter allows a CNAM display. Note, the discussion of how the directory number is obtained is contained below.

Central office 220b then sends this information in the signaling message to central office 220a serving the called party. Central office 220a recognizes that the call is for a CNAM subscriber, so central office 220a halts the calling process to launch a calling name query on the CCS7 network. As a part of the query launch, central office 220a populates a called party address parameter in the query with the communication gateway directory number.

After central office 220a has populated the called party address parameter, the calling name query is sent to a signaling transfer point (STP) 250a. The STP 250a performs a global title translation (GTT) on the called party address parameter to determine to which serviced control point (SCP) the calling name query should be routed. This determination can be made based on the first three digits in the communication gateway directory number. The STP 250a then forwards the calling name query to the appropriate SCP 261. The SCP 261 searches the subscriber information database 266 for the communication gateway's record from which the SCP 261 retrieves the associated data field.

The SCP 261 returns the "dynamic" data field associated with the communication gateway's directory number in a transaction capability application part (TCAP) response to central office 220a. The TCAP response is the final message containing instructions on how to handle the call. The TCAP response message ends the SSP/SCP transaction that began with the calling name query. In this example, "Meet me at 8, Veda" is returned in the TCAP response to central office 220a.

When central office 220a completes the telephone call to the called party, central office 220a sends the communication gateway dynamic data field, "Meet me at 8, Veda," and the communication's gateway directory number, as well as the date and time of the call over the called party's line to the called party's display unit 245. This information is then displayed on the called party's display unit 245.

The process of sending this messaging information over the line serving the called party is achieved by using the frequency shift keying (FSK) line signaling protocol as specified in Bellcore Specification TA-NWT-000030, which is incorporated herein by reference. The called party's display unit 245 translates the FSK information and displays the associated messaging text. The text is displayed after a predetermined period of time. In this embodiment, the text is displayed after two rings. After two rings, the communication gateway 285 may then terminate the telephone call. If the communication gateway 285 does not terminate the telephone call, the telephone 240 of the called party continues to ring until the call is answered. However, the message text is still displayed on the display unit 245 after the second ring. Preferably, a voice message will be played, once the call is answered, to notify the called party that a message has been delivered to the called party's display unit 245.

Figure 3:
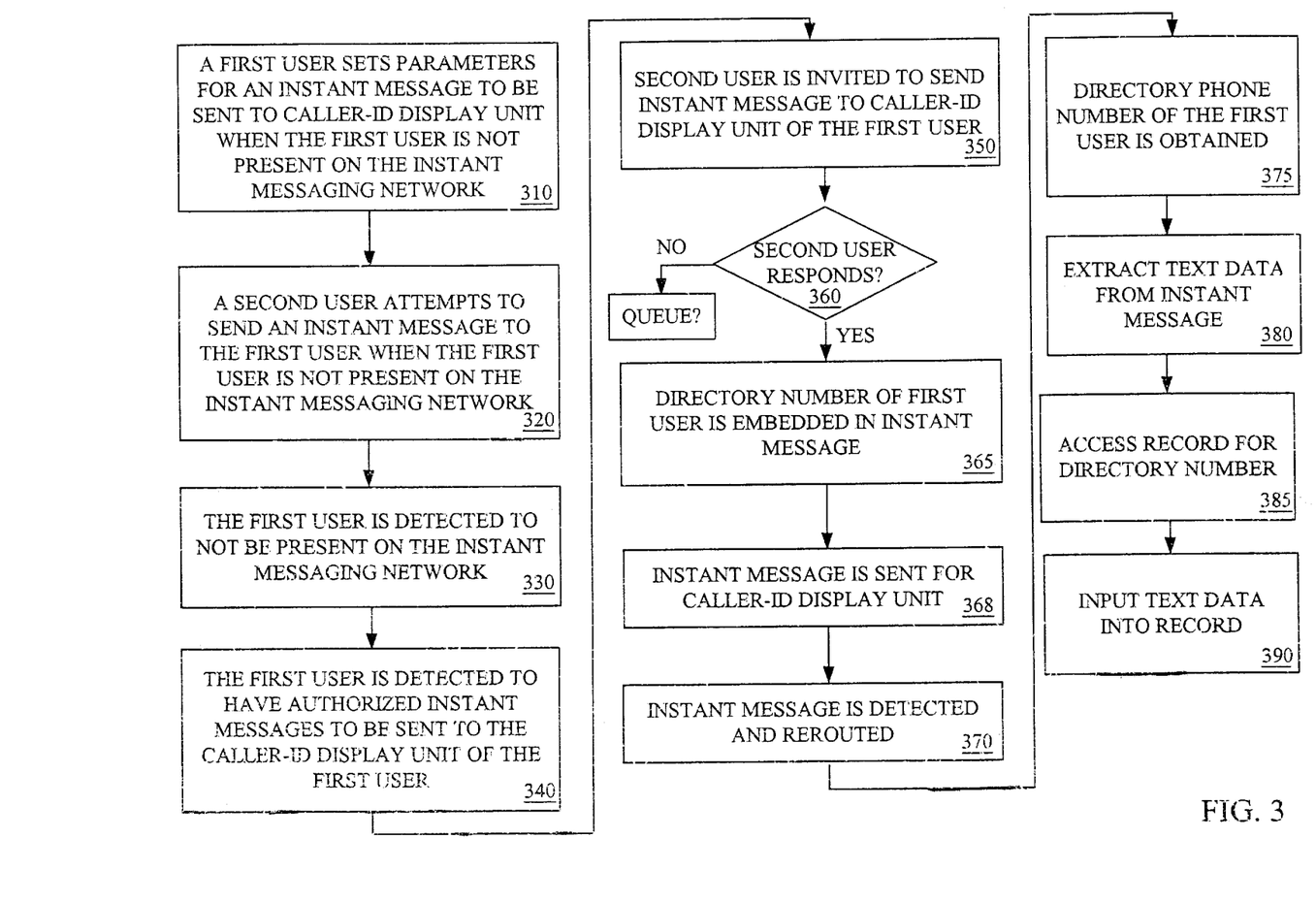
FIG. 3 is a flowchart describing the functionality of a representative implementation of the automated telephone messaging system of FIG. 2.
Figure 4:
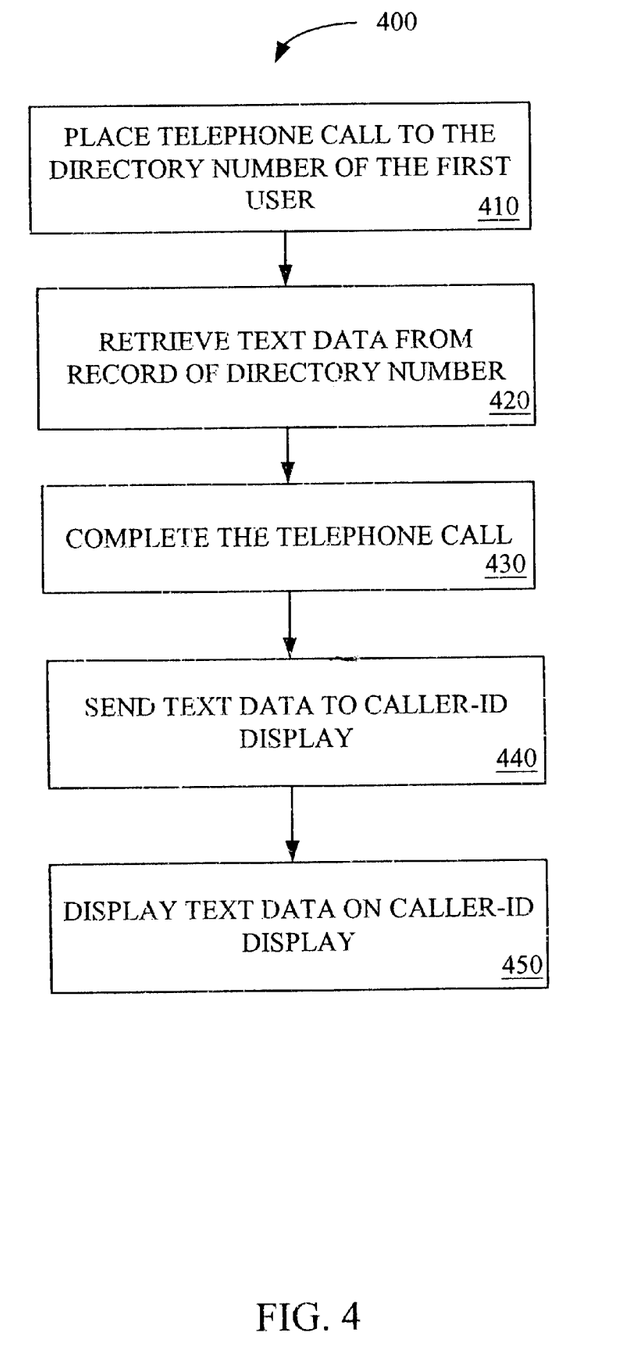
FIG. 4 is a flowchart describing the functionality of a representative implementation of the automated telephone messaging system of FIG. 2.

FIGS. 3–4 are flowcharts depicting a representative embodiment of a method 300 for sending an instant message to a caller-ID display unit 245. Referring to FIG. 3, in block 310, a first user sets parameters for an instant message to be sent through a telephone network 210 to the user's caller-ID display unit 245 when the user is not present on the instant messaging network 270. Typically, the user designates or authorizes in a user profile that the option of sending an instant message to the user's caller-ID display 245 should be offered to someone who wants to send an instant message to the user when the user is not present. The user generally accesses and amends his or her profile via the user's communications client 281. The profile is preferably stored in a database (not shown) that is accessible by the communication server(s) 275 that service the communication client 281 of the first user and the communication clients 280 of other users. Jabber, available from Jabber, Inc. of Denver, Colo., is an open source XML based instant messaging platform that employs similar architecture, for example. Alternatively, some embodiments include the checking of the first user's availability determination.

In block 320, a second user attempts to send an instant message to the first user, when the first user is not present on the instant messaging network 270. In block 330, the communication client 280 of the second user detects that the first user is not present on the communication client and further detects that the first user has authorized instant messages to be sent to the first user's caller-ID display unit 245, as depicted in block 340. Accordingly, the communication client 280 of the second user prompts the second user to send an instant message to the caller-ID display unit 245 of the first user, as depicted in block 350. In block 360, the second user responds to the prompt or inquiry via the communication client 280 of the second user. If the second user responds affirmatively to the inquiry and chooses to send a brief instant message, the communication client 280 of the second user enables the user to generate a brief instant message, such as one containing the text, "Meet me at 8, Veda." In so doing, the communication client 280 of the second user may restrict the amount of text that is included in the instant message to the amount of text that can be contained in the dynamic data field. If the second user responds negatively to the inquiry, then the second user may send the instant message to a queue of the communication server 275, if allowed by the instant messaging network.

In block 365, corresponding to an affirmative response, the directory number of the first user is embedded in the instant message by the communication client 280 of the second user. The communication client 280 of the second user may access the directory number from the profile of the first user. Alternatively, the communication client 280 of the second user may have the directory numbers of respective users stored locally. Also, the directory number may be provided by the second user via manually typing the number.

Within the instant message, the directory number of the first user is identified by a marker or tag. For example, the Jabber instant messaging system is based on XML which incorporates user-defined tags. Therefore, the directory number may be marked by placing a descriptive tag before (and after) the number. In block 368, the communication client 280 of the second user sends the instant message to the communication server 275. Alternatively, in other embodiments, the directory number of the first user may be obtained by the communication server 275 from the profile of the first user and sent to the communications gateway 285.

In block 370, the communication server 275 detects that the instant message should be directed to the communication gateway 285. In this particular embodiment, the communication server 275 detects that the first user is not present on the instant messaging network 270 and verifies from the profile of the first user that the instant message is authorized to be sent to the caller-ID display unit 245 of the first user. Alternatively, the communication client 280 of the second user may distinctly mark the formatting of the instant message as an instant message that is being directed to a caller-ID display 245. Accordingly, in one preferred embodiment of the invention, the communication client 280 of the second user identifies the instant message to be a "caller-ID" instant message by adding a marker or tag, such as <caller-ID message>, to the instant message XML formatting.

In block 370, after the communication server 275 recognizes the distinctness of the instant message, the communication server 275 forwards the instant message to the communication gateway 285 via a communications protocol, such as TCP/IP, for example. The communication gateway 285 then retrieves the directory number of the first user, as depicted in block 375. Since the directory number is embedded within the instant message, the communication gateway 285 may identify the directory number from its associated tags/markers. In block 380, the communication gateway 285 extracts the text data in the instant message and accesses the record in the subscriber information database 266 corresponding to the directory number of the first user, as depicted in block 385. For the dynamic data field associated with the directory number, the communication gateway 285 inputs the text data into the data field, as depicted in block 390.

Now referring to FIG. 4, in block 410, the communication gateway 285 places a telephone call to the first user at the directory number listed in the profile of the first user. In block 420, the SCP 260 servicing the called party searches the subscriber information database 266 for the record associated with the directory number of the communication gateway and retrieves the associated dynamic data field. The SCP 260 then returns the dynamic data field containing the instant messaging text to central office 220*a*. In block 430, central office 220*a* completes the call and sends the dynamic data field to the first user's telephone line to the first user's display unit 245, as depicted in block 440. This information is then displayed on the first user's display unit 245, as shown in block 450.

The communication server 275, client 280, or gateway 285 of a representative embodiment of the present invention can be implemented in software, firmware, hardware, or a combination thereof. Preferably, the communication server 275, client 280, or gateway 285 is implemented in software, as an executable program, and is executed by a digital computer, such as a personal computer, workstation, minicomputer, or mainframe computer. An example of a digital computer that can implement the communication server 275, client 280, or gateway 285 of one preferred embodiment of the present invention is shown in FIG. 5.

Figure 5:
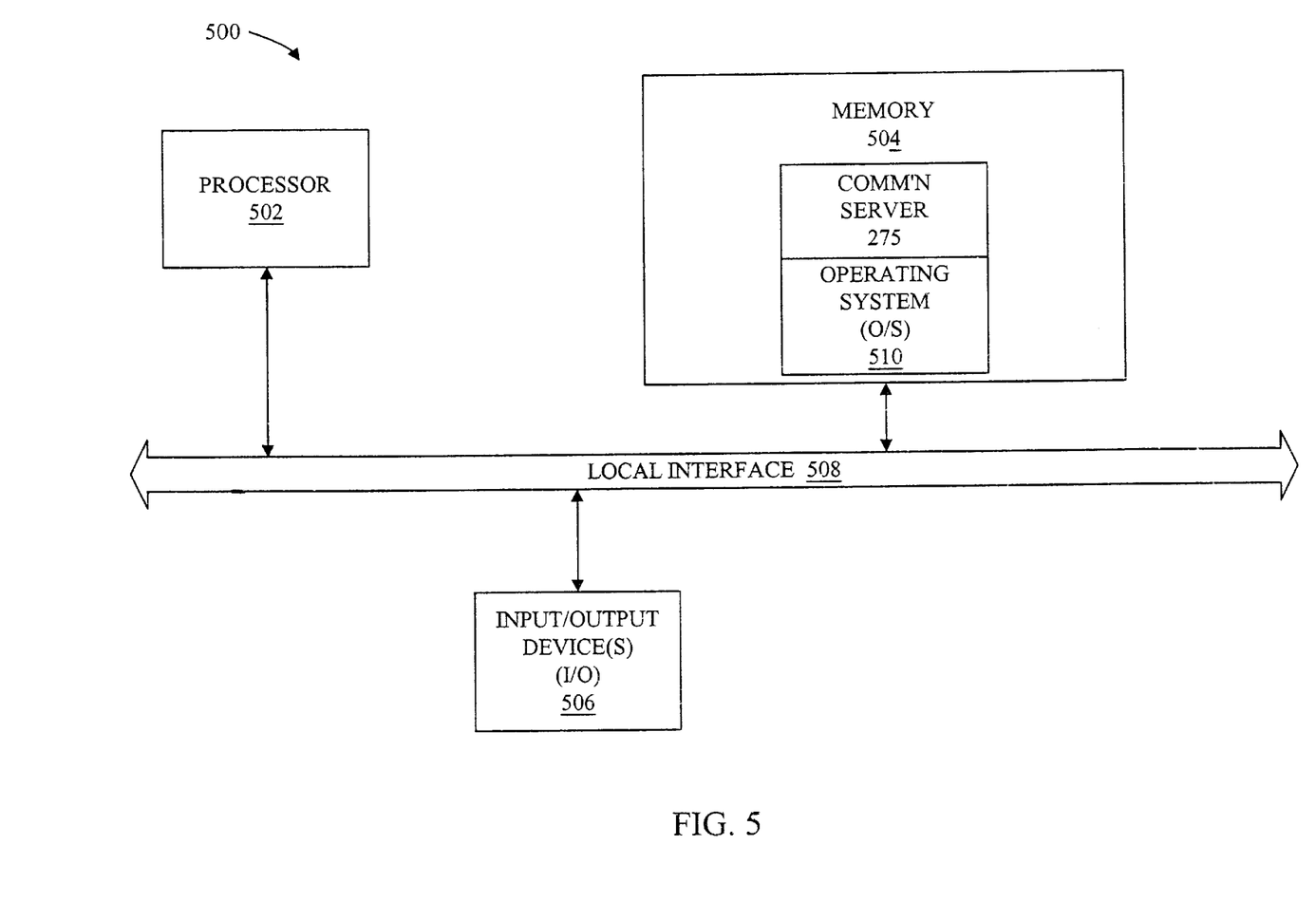
FIG. 5 is a block diagram of an implementation of the communication server in FIG. 2 using a digital computer system.

Generally, in terms of hardware architecture, as shown in FIG. 5, the computer 500 includes a processor 502, memory 504, and one or more input and/or output (I/O) devices 506 (or peripherals) that are communicatively coupled via a local interface 508. The local interface 508 can be, for example but not limited to, one or more buses or other wired or wireless connections, as is known in the art. The local interface 508 may have additional elements, which are omitted for simplicity, such as controllers, buffers (caches), drivers, repeaters, and receivers, to enable communication. Further, the local interface may include address, control, and/or data connections to enable appropriate communication among the aforementioned components.

The processor 502 may be a hardware device for executing software that can be stored in memory 504. The processor 502 can be any custom made or commercially available processor, a central processing unit (CPU) or an auxiliary processor among several processors associated with the computer 500, and a semiconductor based microprocessor (in the form of a microchip) or a macroprocessor.

The memory 504 can include any one or combination of volatile memory elements (e.g., random access memory (RAM, such as DRAM, SRAM, etc.)) and nonvolatile memory elements (e.g., ROM, hard drive, tape, CDROM, etc.). Moreover, the memory 504 may incorporate electronic, magnetic, optical, and/or other types of storage media. Note that the memory 504 can have a distributed architecture, where various components are situated remote from one another, but can be accessed by the processor 502.

The software in memory 504 may include one or more separate programs, each of which comprises an ordered listing of executable instructions for implementing logical functions. In the example of FIG. 5, the software in the memory 504 includes the communication server 275 and an operating system (O/S) 510. Correspondingly, the software could also include the communication client 280 or gateway 285 (not shown). The operating system 510 essentially controls the execution of other computer programs, and provides scheduling, input-output control, file and data management, memory management, and communication control and related services.

The communication server 275, client 280, or gateway 285 may be a source program, executable program (object code), script, or any other entity comprising a set of instructions to be performed. If the communication server 275, client 280, or gateway 285 is a source program, then the program needs to be translated via a compiler, assembler, interpreter, or the like, which may or may not be included within the memory 504, so as to operate properly in connection with the O/S 510. Furthermore, the communication server 275, client 280, or gateway 285 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada.

The I/O devices 506 may include input devices, for example but not limited to, a keyboard, mouse, scanner, digital camera, multi-function device, digital sender, microphone, etc. Furthermore, the I/O devices 506 may also include output devices, for example but not limited to, a printer, display, etc. Finally, the I/O devices 506 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 500 is a PC, workstation, or the like, the software in the memory 504 may further include a basic input output system (BIOS) (omitted for simplicity). The BIOS is a set of essential software routines that initialize and test hardware at startup, start the O/S 510, and support the transfer of data among the hardware devices. The BIOS is stored in ROM so that the BIOS can be executed when the computer 500 is activated.

When the computer 500 is in operation, the processor 502 is configured to execute software stored within the memory 504, to communicate data to and from the memory 504, and to generally control operations of the computer 500 pursuant to the software. The communication server 275 (or the communication client 280 or gateway 285) and the O/S 510, in whole or in part, but typically the latter, are read by the processor 502, perhaps buffered within the processor 502, and then executed.

When the communication server 275, client 280, or gateway 285 is implemented in software, as is shown in FIGS. 3–4, it should be noted that the communication server 275, client 280, or gateway 285 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The communication server 275, client 280, or gateway 285 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the communication server 275, client 280, or gateway 285 is implemented in hardware, communication server 275, client 280, or gateway 285 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. For example, alternative preferred embodiments of the present invention employ different messaging technologies, such as email and short message service (SMS). All such modifications and variations are intended to be included herein within the scope of this disclosure and the present invention and protected by the following claims.

Therefore, having thus described the invention, at least the following is claimed:

1. A system for relaying a communication message from a communication network to a first user over a telephone link, comprising:
    a communication gateway operative to receive the communication message, the communication gateway further operative to direct the communication message over the telephone line to a caller-ID display box of the first user;
    a communication server operative to send the communication message to the communication gateway; and
    a communication client of the second user operative to:
        detect that the first user is not present to receive the communication message; and
        invite the sending of a brief instant message to the caller-ID display box of the first user.

2. The system of claim 1, wherein the caller-ID display box is operative to display the communication message, the caller-ID display box coupled to a telephone line of the first user.

3. The system of claim 1, further comprising:
    a subscriber information database containing a record having a data field of the first user, wherein the communication gateway is configured to:
    extract text data from the communication message;
    obtain a directory number of the first user;
    retrieve a record associated with the directory number of the first user from the subscriber information database;
    populate the data field in the record with the text data;
    place a telephone call to the directory phone number of the first user;
    send the text data to the caller-ID display box over the telephone line; and
    display the text data on the caller-ID display box.

4. The system of claim 3, wherein the directory number is embedded in the communication message.

5. The system of claim 3, wherein the communication gateway is further configured to populate the data field with identification information of a second user who sent the communication message.

6. The system of claim 1, further comprising:
    a communication client of a first user operative to authorize the communication message to be directed to the caller-ID display box.

7. The system of claim 6, further comprising:
    a communication client of the second user operative to:
    initiate the sending of the message to the first user; and
    detect that the message has been authorized by the first user to be sent to the caller-ID display box of the first user.

8. The system of claim 7, the communication client of the second user further operative to mark the message.

9. The system of claim 1, wherein the communication network is an email network.

10. The system of claim 1, wherein the communication network is an instant messaging network.

11. A method for relaying a communication message over a telephone line to a first user, comprising the steps of:
    receiving a communication message from a communication network;
    directing the communication message to a caller-ID display unit of the first user;
    detecting that the first user is not present to receive the communication message; and
    inviting the sending of a brief instant message to the caller-ID display unit of the user.

12. The method of claim 11, further comprising the step of:
    authorizing the communication message to be sent to the caller-ID display unit.

13. The method of claim 12, further comprising the step of:
    sending a communication message addressed to the first user; and
    detecting that the communication message addressed to the first user has been authorized by the first user to be directed to the caller-ID display unit of the first user.

14. The method of claim 13, further comprising the step of:
    marking the communication message.

15. The method of claim 11, the directing step comprising:
    extracting text data from the communication message;
    obtaining a directory number of the first user;

placing a telephone call to the directory number of the first user;

sending the text data in the data field to the caller-ID display unit over the telephone line; and displaying the text data on the caller-ID display unit.

16. The method of claim 15, wherein the directory number is embedded in communication message.

17. The method of claim 15, further comprising the step of:

storing the text data in a data field associated with the directory number; and retrieving the text data from the data field in order to send the text data to the caller-ID display unit.

18. The method of claim 17, further comprising the step of:

populating the data field with identification information on a second user who sent the communication message.

19. The method of claim 11, wherein the communication network is an email network.

20. The method of claim 11, wherein the communication network is an instant messaging network.

21. A computer readable medium having a computer program for sending a communication message over a telephone line to a first user, the program for performing the steps of:

detecting that the first user is not present to receive the communication message;

attempting to send the communication message to the first user;

receiving the communication message from a communication network; and directing the communication message to a caller-ID display unit of the first user.

22. The medium of claim 21, the program further comprising the step of:

authorizing the communication message to be sent to the caller-ID display unit.

23. The medium of claim 22, the program further comprising the step of:

sending a communication message addressed to the first user; and detecting that the communication message addressed to the first user has been authorized by the first user to be directed to the caller-ID display unit of the first user.

24. The medium of claim 23, the program further comprising the step of:

marking the communication message.

25. The medium of claim 21, the directing step comprising:

extracting text data from the message;

obtaining a directory number of the first user;

placing a telephone call to the directory phone number of the first user;

sending the text data to the caller-ID display box unit over the telephone line; and displaying the text data on the caller-ID display unit.

26. The medium of claim 25, wherein the directory number is embedded in communication message.

27. The medium of claim 25, the program further comprising the steps of:

storing the text data extracted from the message in a data field; and retrieving the text data from the data field in order to send the text data to the caller-ID display unit.

28. The medium of claim 27, the program further comprising the step of:

populating the data field with identification on the sender of the instant message.

29. The medium of claim 21, wherein the communication network is an email network.

30. The medium of claim 21, the program further comprising:

inviting the sending of a brief instant message to the caller-ID display of the first user.

31. The medium of claim 21, wherein the communication network is an instant messaging network.

* * * * *